United States Patent [19]
McRobert

[11] 3,952,485
[45] Apr. 27, 1976

[54] ADJUSTABLE HEDGER

[75] Inventor: Leon R. McRobert, Ocoee, Fla.

[73] Assignee: FMC Corporation, San Jose, Calif.

[22] Filed: Apr. 16, 1975

[21] Appl. No.: 568,645

[52] U.S. Cl. .................................................. 56/235
[51] Int. Cl.² ......................................... A01D 55/18
[58] Field of Search ............................ 56/233–237, 56/13.5–13.8, 15.9, 16.2

[56] References Cited
UNITED STATES PATENTS

| | | | |
|---|---|---|---|
| 2,940,486 | 6/1960 | Whitmore | 56/237 X |
| 3,487,615 | 1/1970 | Leydig et al. | 56/235 |

Primary Examiner—Russell R. Kinsey
Assistant Examiner—J. N. Eskovitz
Attorney, Agent, or Firm—A. J. Moore; C. E. Tripp

[57] ABSTRACT

A double boom adjustable hedger is movable between rows of plants such as citrus trees for trimming branches and foliage from a space of preselected width and inclination between the rows being trimmed. Both cutter booms are supported on a sub-frame that is transversely pivoted on the chassis of a mobile vehicle for simultaneous pivotal movement about a transverse axis. Each boom is independently adjustable on the sub-frame relative to the other boom for pivotal movement about longitudinal axes through a pivotal range of approximately 0° to 10° from the vertical, and for transverse translatory movement for providing an open cut row or space between the booms that lie within the range of between about 5½ to 7½ feet wide measured at the bottom of the booms.

15 Claims, 12 Drawing Figures

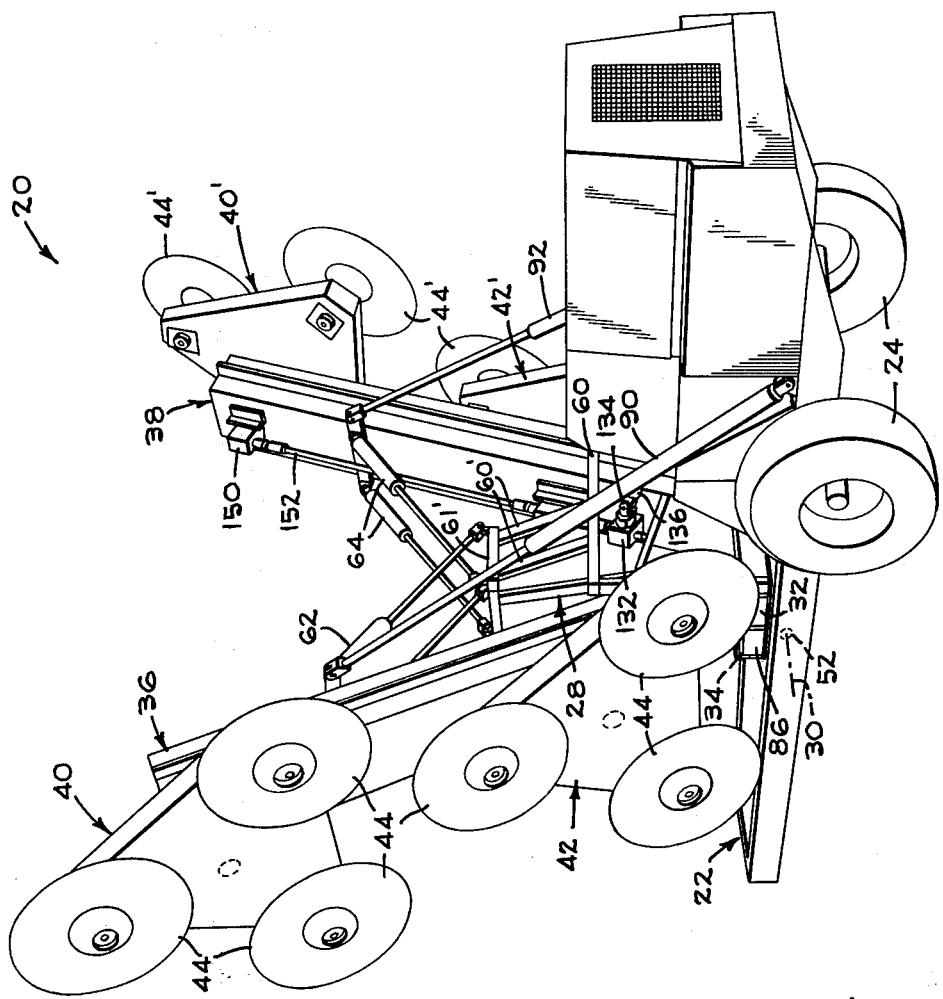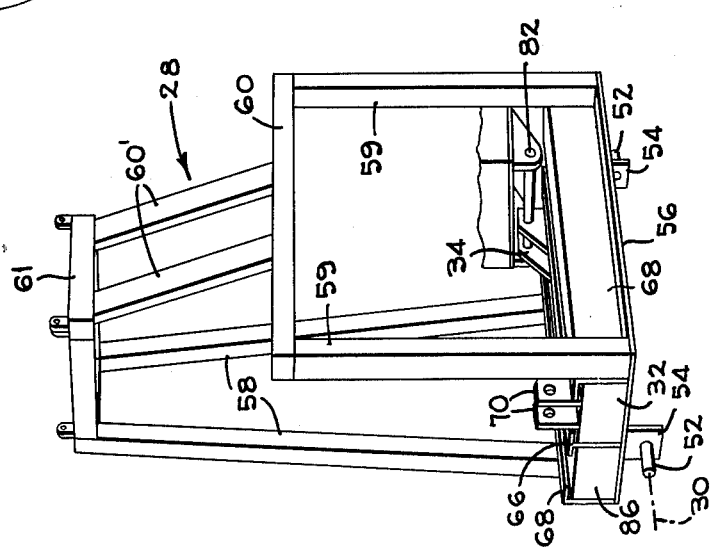

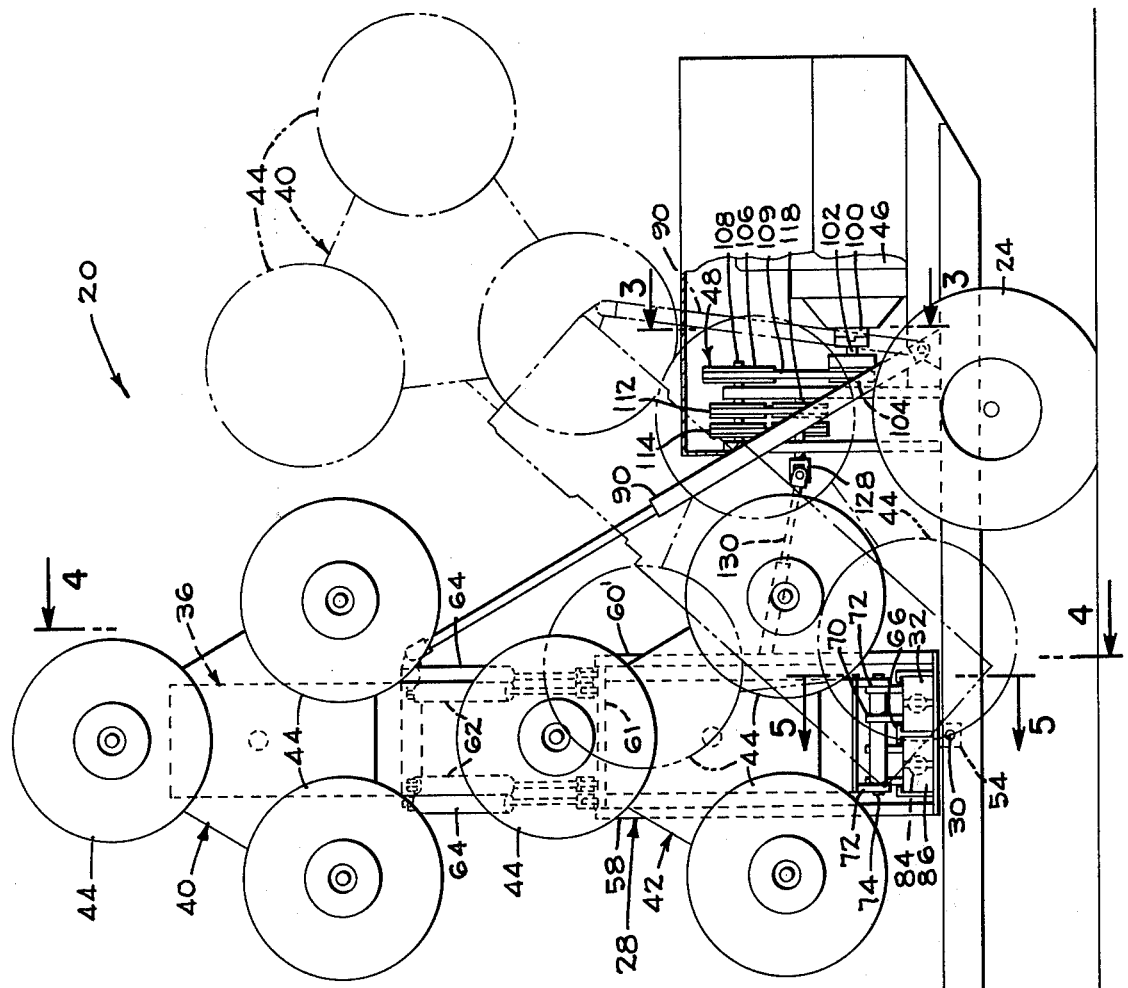
FIG_2
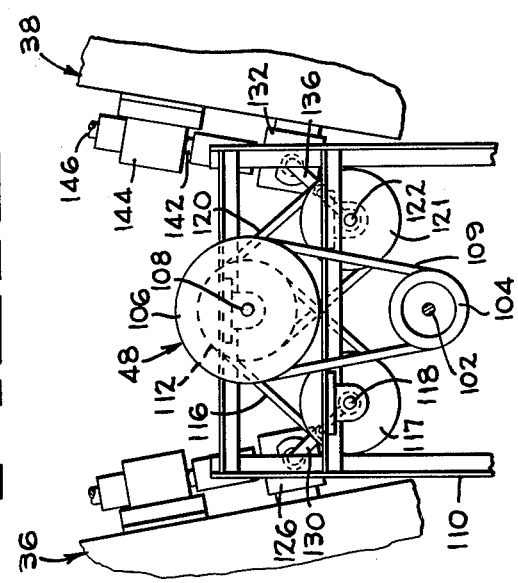
FIG_3

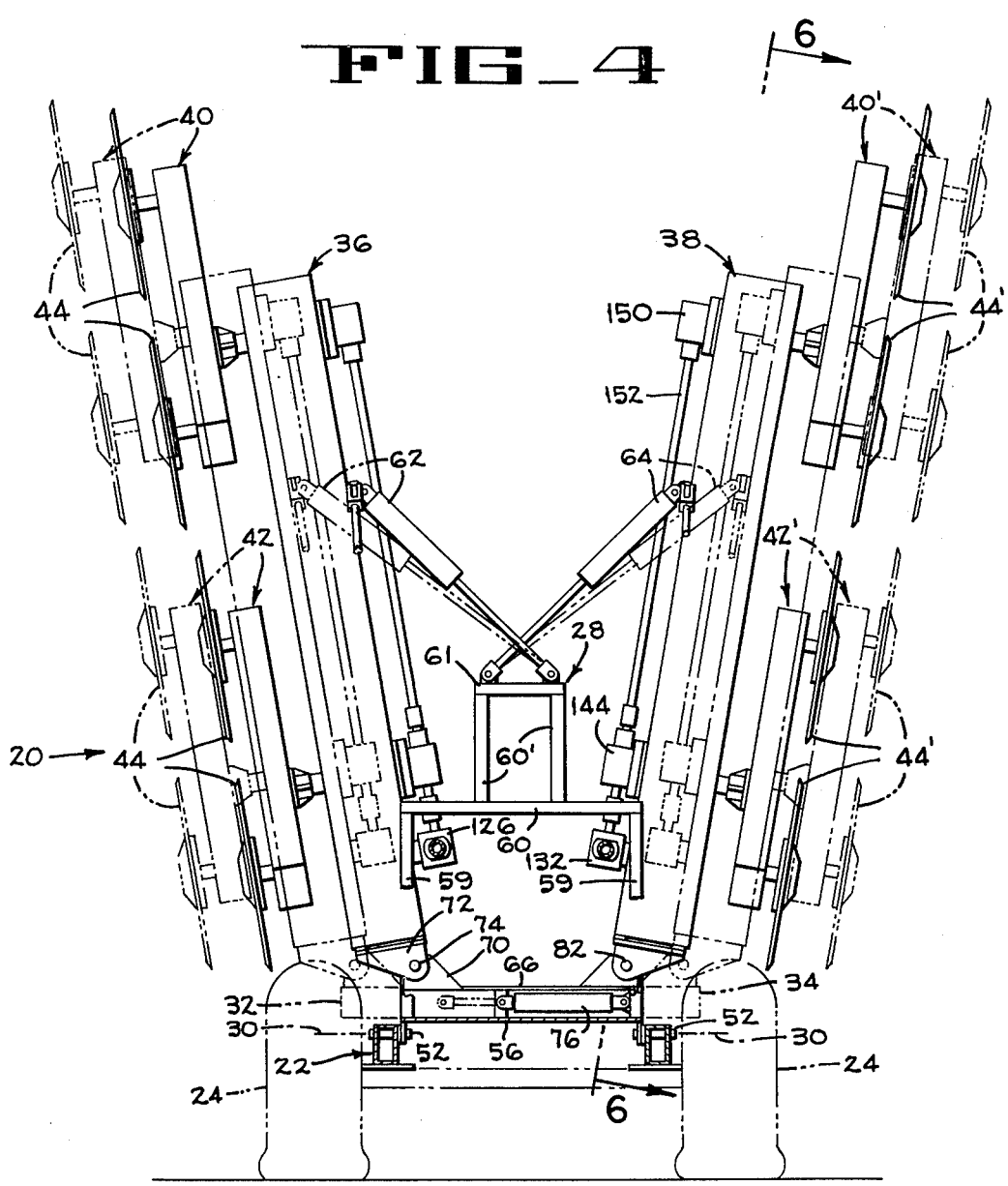
FIG_4
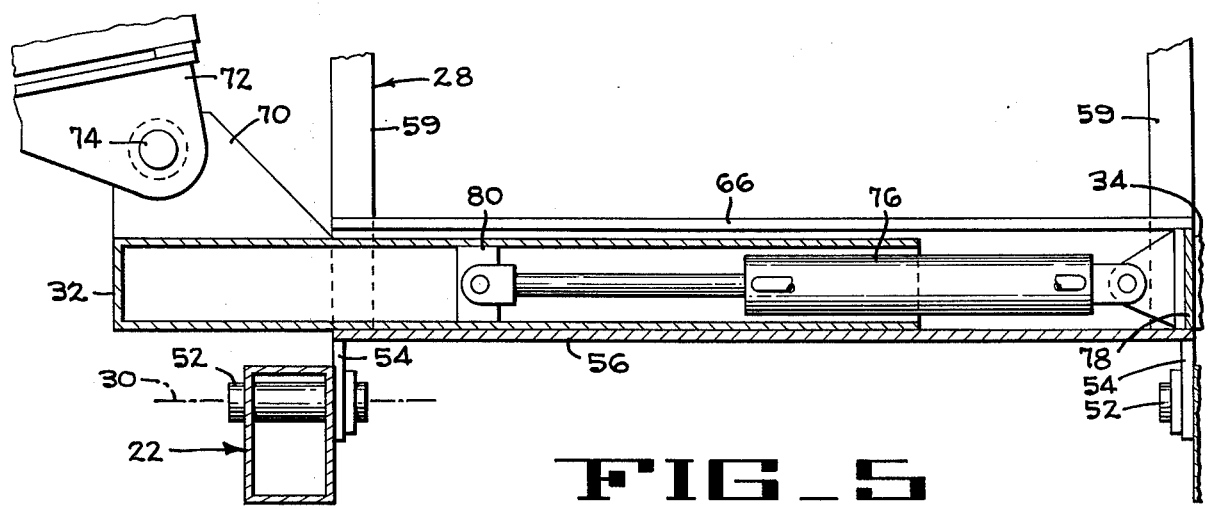
FIG_5

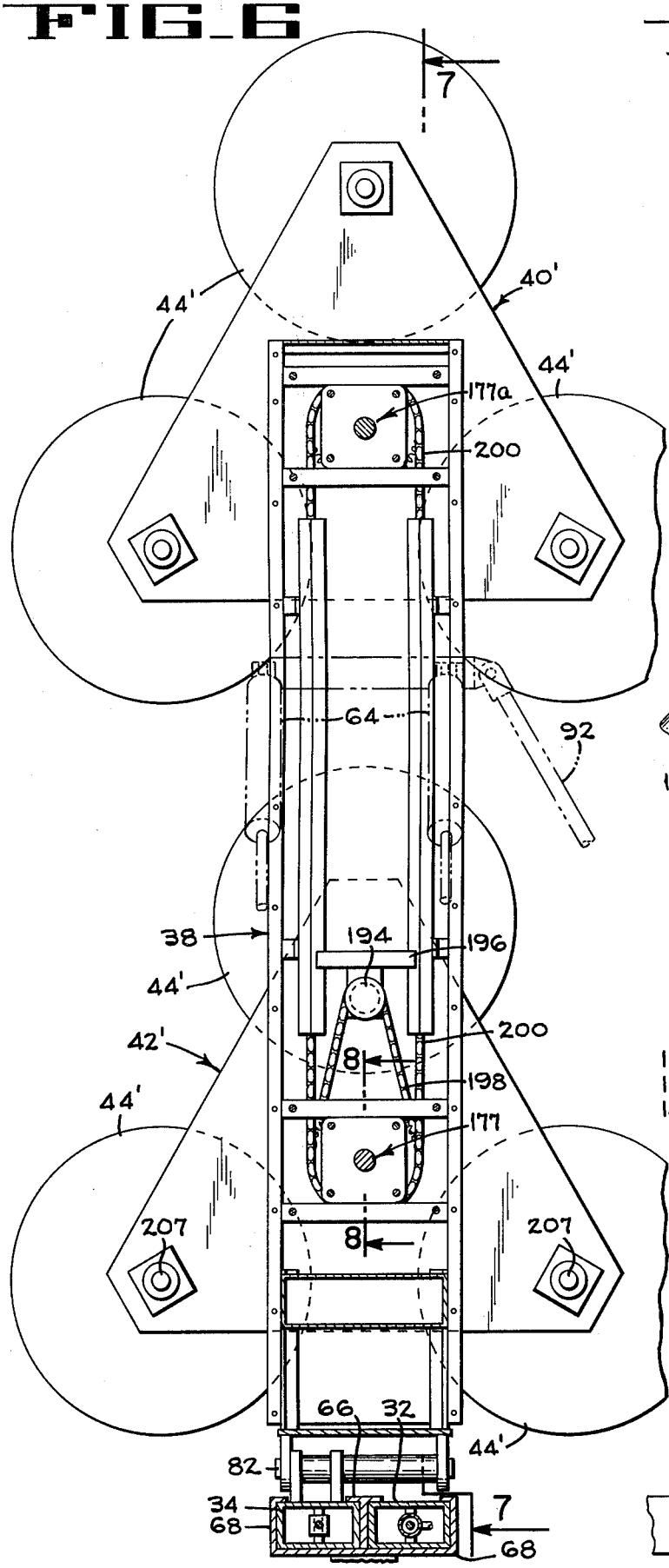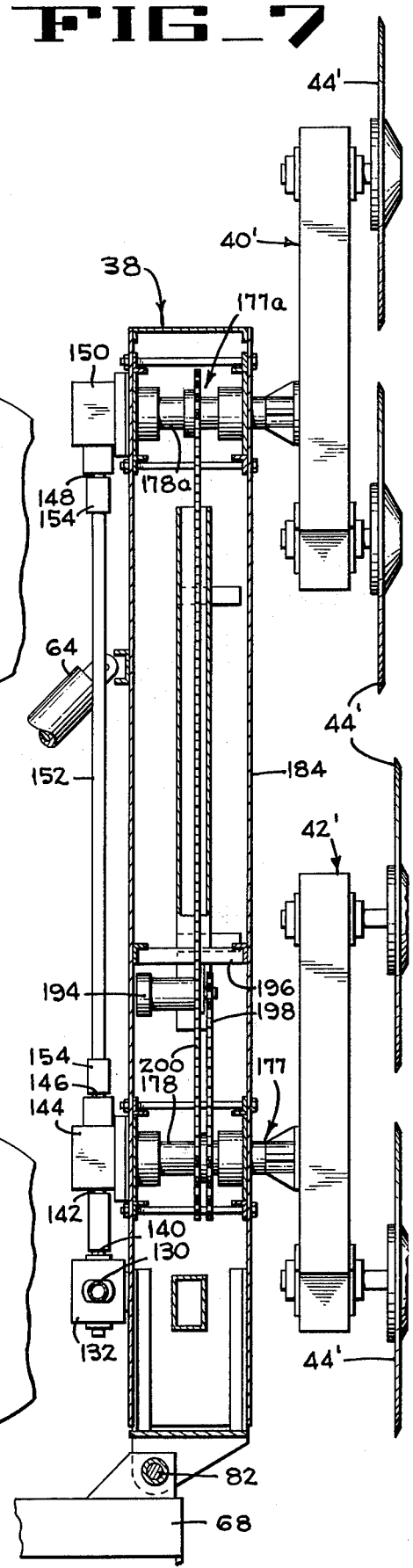

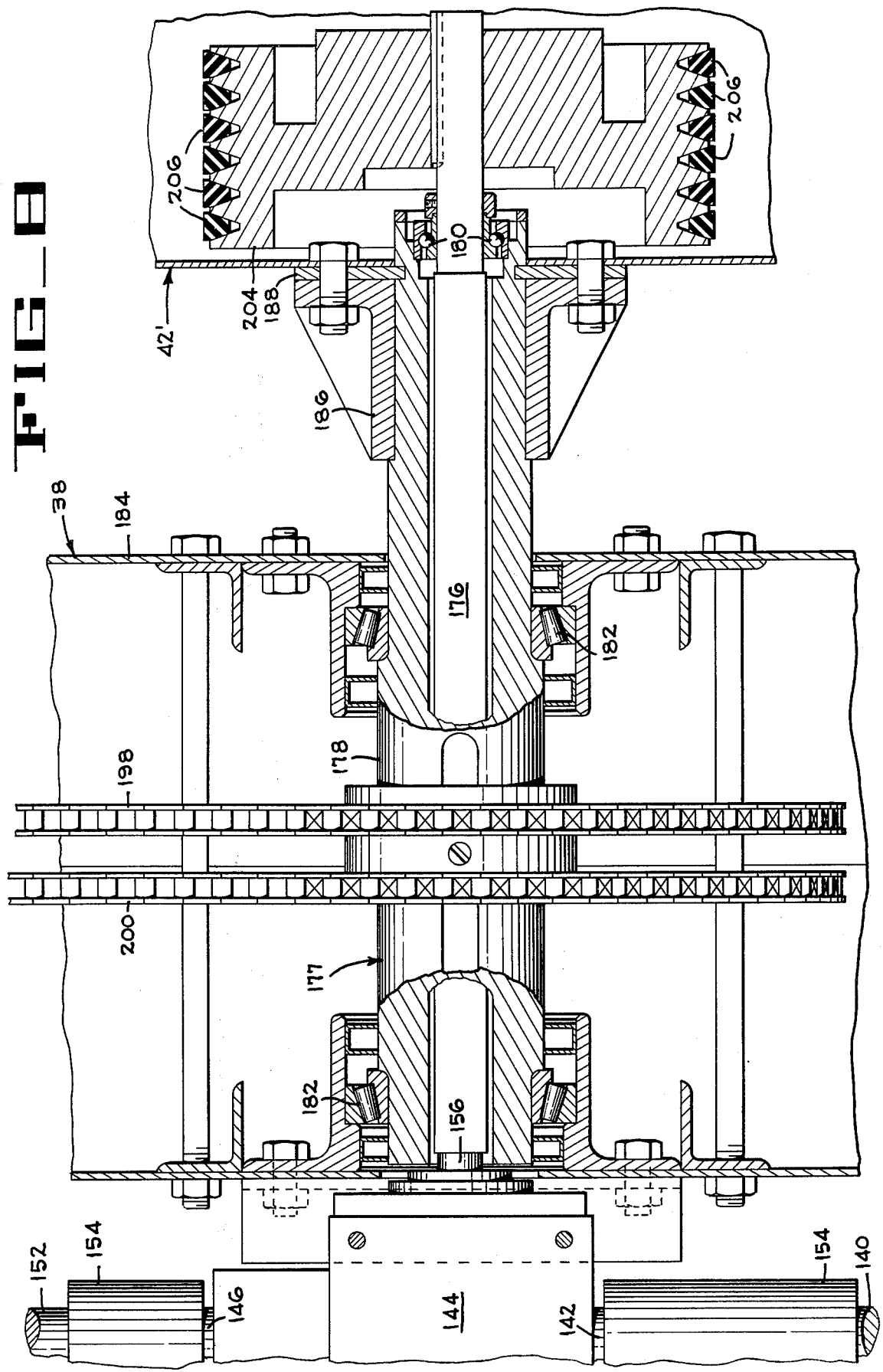

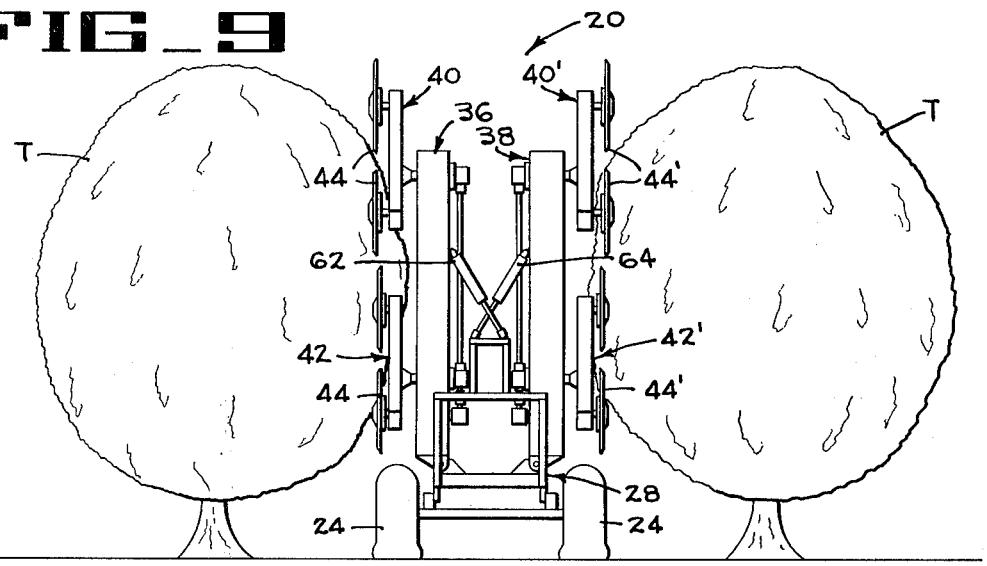
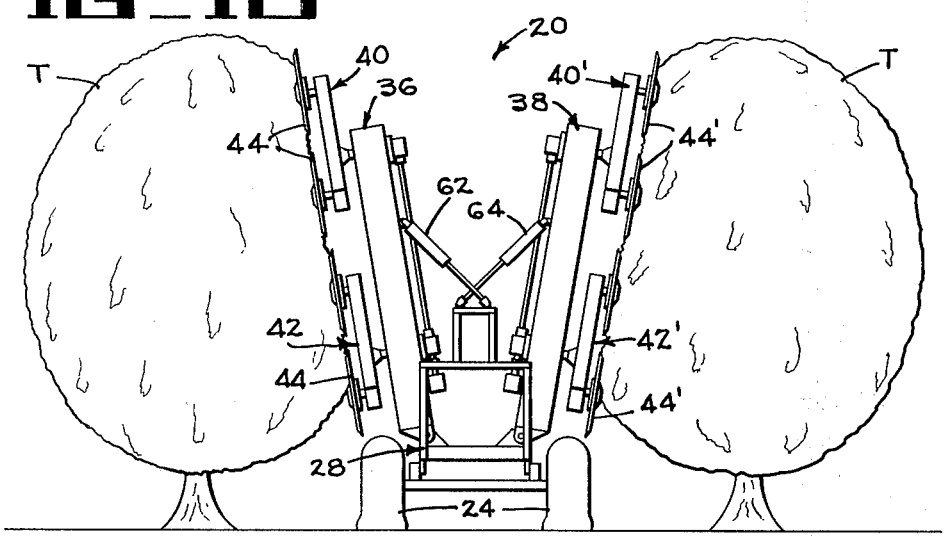
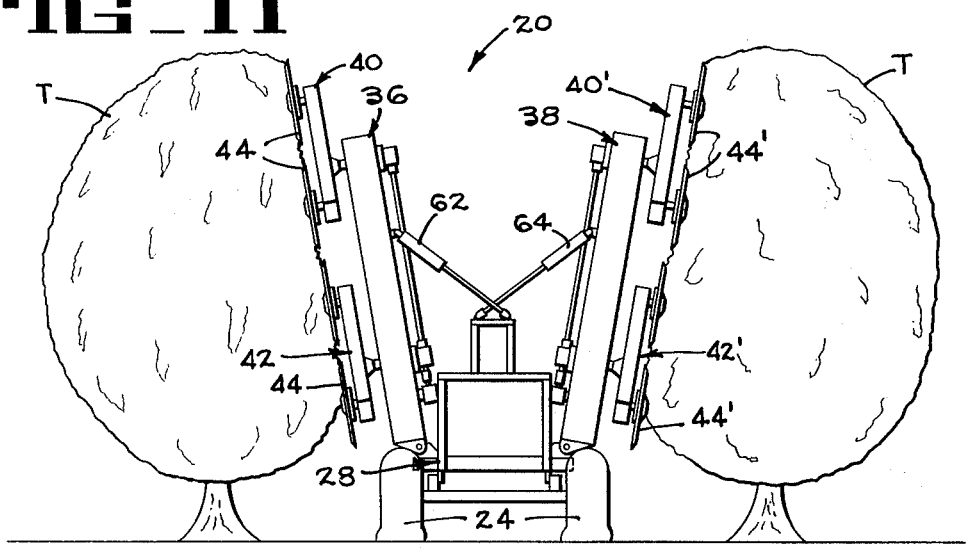

ADJUSTABLE HEDGER

BACKGROUND OF THE INVENTION

1. Field of the Invention

This invention pertains to the pruning or hedging art and more particularly relates to an adjustable hedger having at least one boom mounted on a sub-frame for transverse pivotal movement on and relative to a mobile vehicle, with the boom being mounted for both pivotal and translatory movement on the sub-frame for adjusting its upright angle of inclination about a longitudinal axis and its transverse position relative to the vehicle.

2. Description of Prior Art

Hedgers for use in citrus groves or the like are well known in the art as evidenced by assignees U.S. Pat. No. 3,200,574 which issued to Meadowcroft on Aug. 7, 1955. Meadowcroft discloses a double boom hedger but lacks adjustment for accommodating different widths of cut, transverse angles of cut, and overall height of the hedger.

Assignee's U.S. Pat. No. Re 26,793 which issued to Patterson et al on Feb. 17, 1970, is also pertinent in that it discloses a tree topper that includes a boom supporting two rotating turrets each having a plurality of tree trimming cutters or saws thereon.

The U.S. Pat. No. 2,926,480 to Kimball which issued on Mar. 1, 1960 is likewise somewhat pertinent in that it discloses a single tree topping turret having four radial arms each of which supports a driven circular saw.

Lydig et al U.S. Pat. No. 3,192,695 which issued on July 6, 1965 discloses a single boom hedger with several cutters mounted on a T-shaped boom that oscillates about a transverse axis and that may be pivoted about a longitudinal axis for varying the inclination of cut of the side of a tree.

Lydig et al U.S. Pat. No. 3,487,615 which issued on Jan. 6, 1970 discloses a double boom adjustable hedger having groups of rotary side cutters thereon; and which booms may be pivoted laterally of the vehicle, may be angled relative to the vertical, and may be pivoted about a horizontal axis to vary the elevation of the uppermost cutter.

SUMMARY OF THE INVENTION

The adjustable hedger of the present invention is provided with a transversely pivoted sub-frame that mounts at least one cutter boom for pivotal movement about a transverse axis to vary the height of the uppermost cutter. The subframe also mounts the boom for transverse translatory movement to vary the transverse position of the cutter boom and for pivotal movement about a longitudinal axis to adjust the inclination of the cutter boom. The pivoted sub-frame and the simple cutter drive system provides for a practical and inexpensive hedger which is fully adjustable.

It is, therefore one object of the present invention to provide a hedger having at least one cutter boom that is mounted on a pivoted sub-frame for adjusting the height, width and inclination of the cutter boom relative to the supporting vehicle. Another object is to provide and improved drive system for the cutters on the boom.

BRIEF DESCRIPTION OF THE DRAWINGS

FIG. 1 is a perspective of the adjustable hedger of the present invention taken looking from the rear, and with the towing vehicle being omitted.

FIG. 1A is an enlarged perspective of the sub-frame with a portion of one boom shown attached thereto.

FIG. 2 is a side elevation of the adjustable hedger with the cutter booms being illustrated in solid lines in their elevated cutting positions and in phantom lines in their lowered transport positions.

FIG. 3 is an enlarged vertical transverse section taken along lines 3—3 of FIG. 2 illustrating certain drive parts for the cutters.

FIG. 4 is a transverse section taken along lines 4—4 of FIG. 2 illustrating the cutter booms in their innermost positions in solid lines, and in their outer positions of transverse adjustment in phantom lines, both booms being angled outwardly from the vertical and certain portions of the sub-frame being cut away.

FIG. 5 is an enlarged transverse section taken along lines 5—5 of FIG. 2 illustrating one of the translatory boom adjusting carriages in an extended position in the sub-frame.

FIG. 6 is an enlarged section taken along lines 6—6 of FIG. 4 illustrating the internal drive components in the right cutter boom.

FIG. 7 is a section taken along lines 7—7 of FIG. 6.

FIG. 8 is an enlarged transverse section taken along lines 8—8 of FIG. 6 illustrating one of the lower turret drive mechanisms.

FIG. 9 is an operational view illustrating the hedger in cutting position with both booms vertical.

FIG. 10 is an operational view similar to FIG. 9 but with the booms inclined outwardly and with the lower ends of the booms located at their minimum transverse spacing.

FIG. 11 is an operational view similar to FIG. 10 but with the lower ends of the booms translated outwardly to provide a wider space between the rows of trees.

DESCRIPTION OF THE PREFERRED EMBODIMENT

In general, the adjustable hedger 20 (FIGS. 1 and 2) of the present invention is of the trailer type which is towed between rows of trees T (FIGS. 9, 10 and 11) in groves or orchards to be trimmed by any suitable towing vehicle such as a tractor (not shown). The hedger 20 includes a mobile chassis 22 supported on a plurality of wheels 24 and connected to the tractor by a tongue 26. A sub-frame 28 (FIGS. 1 and 1A) is supported on the chassis for pivotal movement about a transverse axis 30, and slidably carries two transversely translatable boom supporting carriages 32 and 34 which pivotally support a left hand cutter boom 36 and a right hand cutter boom 38, respectively. Each boom carries two rotatable cutter turrets 40, 42 and 40', 42'. Each left cutter turret carries three rotary cutters or saws 44, while each right rotary turret carries three cutters or saws 44'. An engine 46 is carried at the rear of the chassis 22 and is connected to a hydraulic pump (not shown) of a hydraulic system and to the turrets 40, 42, 40', 42' and cutters 44, 44' by a mechanical drive mechanism 48.

More particularly, a pair of pivot pins 52 (FIGS. 1A, 4 and 5) extends through the chassis 22 and through ears 54 of the sub-frame 28 for supporting the sub-frame for pivotal movement through a range of about 45° about transverse pivot axis 30. The sub-frame 28 includes a flat plate 56 (FIGS. 1A, 2, 4 and 5) having two upstanding front legs 58 and two rear legs 59 welded thereto. A horizontal cross beam 60 on the rear legs and two upstanding braces 60' cooperate with the front legs 58 to support a platform 61 which serves as a means for anchoring one end of two pair of boom pivoting hydraulic cylinders 62 and 64.

The reciprocable or translatory boom support carriages 32 and 34 are each of elongated box shape and are slidably supported upon the flat plate 56. The upper edges of the carriages 32 and 34 are slidably supported by a T-shaped center guide rail 66 (FIGS. 1A and 2) and cooperating angle side guide rails 68 all of which are rigidly secured to the flat plate 56 and project upwardly therefrom. As best shown in FIGS. 1A, 2, 4 and 5, the left carriage 32 includes a pair of upstanding ears 70 which are pivotally connected to a mating pair of downwardly projecting ears 72 of the left boom 36 by a pivot pin 74. The carriage 32 projects out of the left side of the sub-frame 28 and is translated outwardly or inwardly by a hydraulic cylinder 76 connected between an end wall 78 of the sub-frame 28 and a vertical web 80 of the carriage 32.

The right carriage 34 supports the right boom 38 in an identical manner for pivotal movement about a pivot pin 82 except that it projects out of the right side of the sub-frame 28 and is actuated by a separate hydraulic cylinder 84 (FIG. 2) that is anchored to a left end wall 86 of the sub-frame 28. Thus, by independent actuation of hydraulic cylinders 76 and 84 the operator may translate the carriages 32 and 34 independently between a minimum spacing (at the lower edges of the lowest saws) of about 5½ feet as diagrammatically indicated in FIGS. 9 and 10, to a maximum spacing of about 7½ feet as indicated in FIG. 11.

As mentioned above, one end of each of the boom pivoting hydraulic cylinders 62 and 64 are pivotally anchored to the upper platform 61 of the sub-frame 28. As best shown in FIGS. 1 and 4, the upper ends of the cylinder 62 are pivotally connected to the left boom 36, while the upper ends of the cylinders 64 are pivotally connected to the right boom 38. Thus, the operator may selectively actuate either pair of cylinders 62 or 64 to pivot the cutter booms about pivot pin 74 or 82 between vertical upright positions as indicated in FIG. 9 and outwardly inclined positions as indicated in FIGS. 10 and 11.

As best illustrated in FIGS. 1, 1A and 2, the sub-frame 28 and the booms 36, 38 are pivoted as a unit about transverse axis 30 by a pair of operator controlled elongated hydraulic cylinders 90 and 92. The cylinders 90, 92 are pivotally connected at their lower ends to the chassis 22 and at their upper ends to the booms 36 and 38, respectively. Thus, the operator can actuate the cylinders 90, 92 to pivot the boom between the solid line and phantom line positions illustrated in FIG. 2.

The drive mechanism 48 (FIGS. 2 and 3) for the cutters 44, 44' and turrets 40, 42, 40', 42' receive their power from the engine 46 through a clutch 100. Engagement of the clutch 100 drives a shaft 102 having a drive pulley 104 thereon which drives a pulley 106 keyed to a shaft 108 by means of a belt 109. The shaft 108 is journaled on a transmission frame 110 and has a pair of pulleys 112 and 114 keyed thereon. The pulley 112 is connected by a belt 116 to a pulley 117 keyed to a left drive shaft 118 that is journaled on the transmission frame 110. Similarly, the pulley 114 is connected by a belt 120 to a pulley 121 keyed to a right drive shaft 122 that is journaled on the transmission frame. As best shown in FIGS. 2 and 3, the left drive shaft 118 is coupled to the input shaft of a left gear box 126 by a pair of universal joints 128 (only one being shown in FIG. 2) and a telescoping drive shaft 130. Similarly, the right drive shaft 122 is coupled to the input shaft of a right gear box 132 by a pair of universal joints 134 (only one being shown in FIG. 1) and a telescoping drive shaft 136.

Since the drive components associated with the left boom 36 and the right boom 38 are substantially identical, only those components associated with the right boom 38, as best illustrated in FIGS. 6 and 7, will be described in detail.

The output shaft 140 of the right gear box 132 is coupled to the input shaft 142 of a gear box 144 having one of its output shafts 146 connected to the input shaft 148 of an upper gear box 150 by an elongated shaft 152 and couplings 154. A second output shaft 156 (FIG. 8) of the gear box 144 is coupled as by splining to a small diameter cutter drive shaft 176 of a lower turret and cutter drive mechanism 177. The shaft 176 is journaled within a tubular lower turret shaft 178 by a bearing 180 at its free end. The tubular shaft 178 is journaled in bearings 182 bolted to the housing 184 of the right boom 38. The lower right cutter turret 42' is secured to the tubular shaft 178 for rotation therewith as by bolting to a collar 186 and split ring 188.

An upper turret and cutter drive mechanism 177a (FIG. 7) is the same as the mechanism 177 and accordingly will not be described in detail, but equivalent parts will be assigned the same numerals followed by the letter a.

A hydraulic motor 194 is connected to the housing of the boom 38 by suitable brackets 196 and drives the lower turret shaft 178 by a chain drive 198. A second chain drive 200 connects the lower turret shaft 178 to the upper turret shaft 178a thereby driving both turrets at the same speed and in the same direction.

The several cutters 44' carried by the lower right turret 42' are driven by a multi-grooved pulley 204 (FIG. 8) keyed to the shaft 176 and having a plurality of pairs of drive belts 206 trained thereon, with each pair of belts being trained around a separate one of the cutter shafts 207 (FIG. 7). Since the cutter drive components are substantially the same as those described and illustrated in the above referred to Patterson et al U.S. Pat. No. Re. 26,793, which patent is incorporated by reference herein, the description of those components will not be described in detail.

In operation of the adjustable hedger 20 of the present invention, the tongue 26 (FIG. 2) of the trailer type chassis 22 is first connected to a towing vehicle or tractor (not shown), and a hydraulic control panel (not shown) is in a panel at the rear of the engine compartment. In addition, the clutch and engine shut down controls are disposed within easy access to the operator while seated on the tractor seat all as is well known in the art. It will be understood that the hydraulic control panel (not shown) includes a single control valve for operating both height control or transverse cylinders 90, 92; another control valve to operate the two left boom cylinders 62, 62 for pivoting the left boom 36 about a longitudinal axis; another control valve to operate the two right boom cylinders 64, 64 for pivoting the right boom 38 about a longitudinal axis; another control valve for operating the left width control cylinder 76 (FIGS. 4 and 6); and a last control valve to operate the right width control cylinder 84.

In order to tow the hedger from place to place, it will of course be understood that the hydraulic controls will be operated to activate the cylinders 76 and 84 so as to retract the booms 36 and 38 into their narrowest positions (FIG. 9); and to cause cylinders 90, 92 to pivot the sub-frame 28 and both booms 36 and 38 as a unit about axis 30 to the lowered phantom line transport position of FIG. 2.

upon entering the grove of trees T (FIGS. 9–11) to be trimmed, the operator actuates cylinders 90, 92 (FIG. 2) to pivot the booms 36 and 38 into their vertical cutting positions. Normally the trimming takes place when the booms are in their full line upright position illustrated in FIG. 2, but it will be understood, that if desired, trimming of small trees or the like may occur when the booms are rearwardly inclined and spread far enough apart to prevent cutting the tires.

The operator then determines the desired cutting width between the right and left cutters 44 and 44'. The operator's determination will be based on the spacing between tree rows, the size of the trees, and the amount of foliage desired to be removed. The operator then actuates the hydraulic cylinders 76 and 84 (FIGS. 2 and 4) to adjust the spacing between cutters 44, 44' to the desired access row spacing between the rows of trees being trimmed. The access row width may lie within the range of anywhere between about 5½ – 7½ feet measured at the bottom of the bottom saws or cutters 44, 44'.

The trees may be trimmed when the booms 36, 38 are vertical as viewed from the rear as indicated in FIG. 9, or are pivoted outwardly to any position within the range of about 0° to 15° when the booms are at their inner spacing as indicated in FIG. 10, or at 0° to 10° when the booms are in their wide spacing of FIG. 11.

Although the adjustable hedger 20 is illustrated as a double boom machine with both booms being symmetrically adjusted, it will be understood that each boom may be transversely adjusted independently of the other if desired. It will also be understood that the hedger may operate as a single boom hedger by merely removing or deactivating one boom along with the drive and control parts therefor.

In the illustrated preferred embodiment of the adjustable hedger, a cutting rate of about 1 to 3½ miles per hour, depending upon the density of cut required, is obtained, with the turrets rotating within the range of about 20 – 60 RPM and with the cutters rotating at a speed of about 1600 RPM. The maximum cutting height of the preferred embodiment is about 16½ feet when the booms are angled outwardly 5°, and the width of cut is between 5½ to 7½ feet measured between the bottom of the cutter saws. Although the above operational and design characteristics of the adjustable hedger 20 apply to the preferred embodiment when trimming citrus trees, it will be understood that the scope of the invention is not to be limited to these specific dimensions and operating characteristics.

Although the best mode contemplated for carrying out the present invention has been herein shown and described, it will be apparent that modification and variation may be made without departing from what is regarded to be the subject matter of the invention.

I claim:

1. An adjustable hedger movable between rows of trees or the like to be trimmed comprising; a mobile vehicle having a longitudinal axis and including a chassis, a sub-frame supported on said chassis for pivotal movement about a transverse pivot axis, a cutter boom supported by said sub-frame for translatory movement parallel to said transverse pivot axis and for pivotal movement in a transverse plane containing said transverse pivot axis, rotatable cutter means on said boom, and power means on said vehicle for driving said rotatable cutter means and for independently translating and pivoting said boom relative to said sub-frame.

2. An adjustable hedger according to claim 1 and additionally comprising a plurality of turrets, means rotatably mounting said turrets on said boom, a plurality of said rotatable cutter means being mounted on each turret, and said power means including means for driving said turrets.

3. An adjustable hedger according to claim 1 wherein said sub-frame and cutter boom are pivotable between a substantially vertical upright position and a position angled about 10° transversely outward from a vertical position.

4. An adjustable hedger according to claim 1 wherein said sub-frame and cutter boom are pivoted between a substantially vertical upright position and a transport position angled about 45° rearwardly from the vertical.

5. An adjustable hedger according to claim 1 wherein said boom may be translated laterally through a range of about 1 foot.

6. An adjustable hedger according to claim 1 wherein a carriage is slidably supported on said sub-frame for translatory movement parallel to said transverse pivot axis, and wherein pivot means are provided to pivotally connect the lower end of said cutter boom to said carriage.

7. An adjustable hedger according to claim 6 wherein the lower end of said carriage and boom may be translated through a distance of about 1 foot.

8. An adjustable hedger according to claim 1 wherein said boom is supported by said sub-frame on one side thereof, and additionally comprising a second cutter boom on the other side of said vehicle connected to said sub-frame for translatory movement parallel to said first transverse pivot axis and for pivotal movement in a transverse plane containing said transverse pivot axis, rotatable cutter means on said second boom, and said power means including means for driving said second cutter means and for independently translating said second boom relative to said sub-frame and said first boom.

9. An adjustable hedger movable between rows of trees or the like to be trimmed comprising; a mobile vehicle having a longitudinal axis and including a chassis, a sub-frame supported on said chassis for pivotal movement about a transverse pivot axis, a pair of carriages slidably supported by said sub-frame with each carriage being mounted for translatory movement outwardly from opposite sides of said sub-frame and parallel to said transverse pivot axis, a pair of cutter booms, means mounting one cutter boom on one of said carriages and the other cutter boom on the other carriage for pivotal movement about longitudinal axes in a transverse plane containing said transverse axis, rotatable cutter means on each boom, and power means on said vehicle for driving said rotatable cutter means and for independently translating each of said carriages and independently pivoting each of said booms relative to said sub-frame in said transverse plane, said power means including means for pivoting said cutter booms and said sub-frame about said transverse axis as a unit.

10. An adjustable hedger according to claim 9 and additionally comprising a plurality of turrets on each boom, means for rotatably mounting said turrets on associated ones of said booms, a plurality of rotatable cutter means mounted on each turret, and said power means including means for driving each of said turrets.

11. An adjustable hedger according to claim 9 wherein said booms are pivotable between substantially vertical upright positions and positions angled about 10° transversely outward from said vertical positions.

12. An adjustable hedger according to claim 9 wherein said sub-frame and cutter booms are pivoted between substantially vertical upright positions and a transport position angled about 45° rearwardly from the vertical.

13. An adjustable hedger according to claim 9 wherein each of said booms may be translated laterally about one foot for cutting a path between tree rows having a width between about 5½ to 7½ feet.

14. An adjustable hedger according to claim 9 wherein the means for translating said carriages and for pivoting said booms are independently controlled hydraulic cylinders.

15. An adjustable hedger according to claim 10 wherein the means for rotatably mounting each of said turrets includes a tubular turret shaft, and wherein the means for driving said rotary cutters includes a shaft journaled within said tubular turret shaft.

* * * * *